Patented Oct. 6, 1942

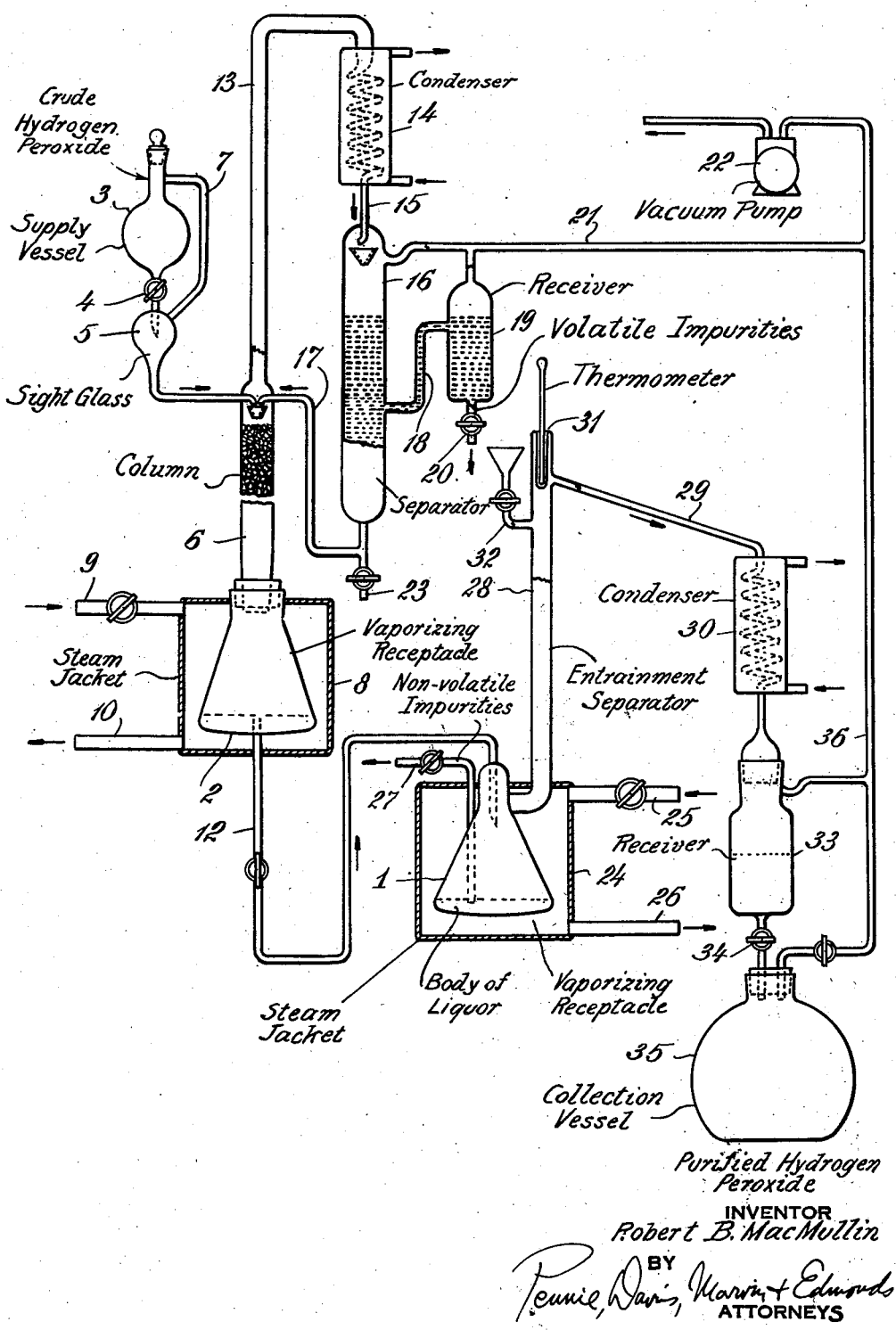

2,298,064

UNITED STATES PATENT OFFICE 2,298,064

CHEMICAL MANUFACTURE

Robert B. MacMullin, Niagara Falls, N. Y., assignor to The Mathieson Alkali Works, Inc., New York, N. Y., a corporation of Virginia Application December 29, 1939, Serial No. 311,464

13 Claims. (Cl. 202—52)

This invention relates to improvements in the purification of aqueous hydrogen peroxide. It is of special value and application in the purification of concentrated solutions of hydrogen peroxide produced by oxidation of organic intermediates in solvents immiscible with water from which the hydrogen peroxide is extracted with water.

Conventionally, aqueous hydrogen peroxide is prepared either by (a) acidification of barium peroxide with sulphuric acid followed by separation of barium sulphate and concentration by distillation of the dilute aqueous solution of hydrogen peroxide thus formed or by (b) electrolysis of ammonium sulphate or sulphuric acid to form ammonium persulphate or persulphuric acid, thermal dissociation of these compounds, distillation of a dilute aqueous hydrogen peroxide from the reaction products and concentration of the dilute material either by partial condensation or by further distillation. The original aqueous hydrogen peroxide produced by either of these methods usually contains from about 3% to about 5% $H_2O_2$ by weight. Concentration of this aqueous hydrogen peroxide, with incidental purification, has been effected by special distillatory operations.

In the production of hydrogen peroxide by the oxidation of organic intermediates, for example as described in Reissue Patent No. 20,769 and in Patents Numbers 2,059,569 and 2,144,341, the aqueous hydrogen peroxide as directly produced is usually of a concentration approximating that required in the commercial product, 30% $H_2O_2$ by weight for example, but it is usually contaminated with impurities characteristic of this method of production. Aqueous hydrogen peroxide of concentrations as high as 45% $H_2O_2$ can be produced directly in this manner. The problem thus is one of purification rather than concentration, and the impurities characteristic of such methods of production are essentially different from the materials from which aqueous hydrogen peroxide must be separated in the conventional methods of production previously mentioned.

The impurities with which this invention is concerned, normally present in but small proportion, include the water immiscible solvents such as hydrocarbon oils and the intermediates such as para-azo-toluene and decomposition products of these various materials with which the aqueous hydrogen peroxide produced by oxidation of organic intermediates is usually contaminated. Such organic impurities may be colorless or colored, odorless or odoriferous, inert or unstabilizing with respect to hydrogen peroxide. They may be entirely in solution or they may be in suspension or partly in suspension or present as colloids. In addition to these organic impurities, inorganic impurities such as iron, nickel, copper, mercury and other metals and their compounds, silica and the like may also be present. These impurities, even in traces, may render the aqueous hydrogen peroxide unstable or they may impart undesirable color, odor, or taste.

This invention provides a novel method of purifying aqueous hydrogen peroxide thus contaminated which has several important advantages. The invention includes (1) a method for eliminating less volatile or non-volatile impurities, (2) a method for eliminating more volatile impurities and (3) a combined operation for the production of aqueous hydrogen peroxide of high purity from hydrogen peroxide solutions, particularly hydrogen peroxide solutions of high concentration, containing impurities such as those previously mentioned. Subsequent reference to the principal operation is reference to method (1) and to the preliminary operation is reference to method (2).

In the combined operation of this invention, the more volatile impurities are separated in a preliminary operation embodying the second method of the invention and the less volatile and non-volatile impurities are then separated in a principal purification operation embodying the first method of the invention.

In the preliminary operation volatile impurities, including some less volatile than hydrogen peroxide, are removed by vaporizing a large volume of water containing a small proportion of hydrogen peroxide from the solution to be purified and passing these vapors in contact with the solution to vaporize the impurities, condensing the vapors and separating the vaporized and condensed impurities from the water component and returning the water component to the solution. Volatile impurities are vaporized by the partial pressure effect of the vaporized water and, being present in but small proportion, can thus be eliminated without substantial loss of hydrogen peroxide because of the relatively low proportion in which the hydrogen peroxide is vaporized with respect to water and because the bulk of the vaporized hydrogen peroxide is returned to the solution with the vaporized and subsequently condensed water after separation of the impurities. This vaporization is best carried out under subatmospheric pressure; an absolute pressure not exceeding about 100 mm. of mercury is advantageous. The impurities being principally immiscible with water can be largely separated from the condensed vapors by permitting stratification to take place and then separating the stratified aqueous and oily material. This separation can be facilitated by extracting the condensed vapors with a solvent immiscible with water, such as toluene or one of the other solvents used in the production of hydrogen peroxide by oxidation of organic intermediates. The water component of the condensed vapors, after separation of impurities, is with advantage returned to the aqueous hydrogen peroxide solution undergoing purification in the region within which vaporization of water and volatile impurities is effected.

In the principal operation, less volatile and non-volatile impurities are removed by distilling the aqueous hydrogen peroxide from the impurities in a manner avoiding incidental or destructive decomposition of hydrogen peroxide. In carrying out this invention, the hydrogen peroxide solution to be purified is supplied to a body of liquor from which water and hydrogen peroxide are vaporized under a subatmospheric pressure, advantageously an absolute pressure not exceeding about 100 mm. of mercury, while maintaining in this body of liquor a substantial hydrogen peroxide concentration not exceeding 75% $H_2O_2$ by weight on the body of liquor at a rate sufficient to limit the holding time in the body of liquor to a maximum of 30, or better 20, minutes, and the body of liquor is periodically purged to eliminate accumulating impurities non-volatile under the conditions of vaporization. The body of liquor is purged with sufficient frequency to prevent accumulation of impurities to an extent involving difficulties due to scaling in the vaporizing receptacle and to avoid danger of destructive decomposition due to the presence of excessive amounts of impurities in contact with hydrogen peroxide of high concentration. An inorganic non-volatile stabilizer of hydrogen peroxide is, with special advantage, maintained present in the body of liquor from which the water and hydrogen peroxide are vaporized during the operation. This stabilizer may be added to the aqueous hydrogen peroxide to be purified, and thus supplied to the body of liquor, but, since it would thus accumulate in the body of liquor as an impurity without corresponding advantage, it is more advantageous to add the stabilizer directly to the body of liquor as required, periodically following each purge for example. If such a stabilizer is not used, the holding time in the body of liquor is best limited not to exceed about 20 minutes. The water and hydrogen peroxide vaporized from the body of liquor are condensed to form the purified aqueous hydrogen peroxide. This condensation may be carried out as a partial condensation to effect some concentration of the aqueous hydrogen peroxide, or it may be carried out as a total condensation to effect a purification without substantial change in concentration. The water and hydrogen peroxide are vaporized from the body of liquor in about the proportions in which they are present in the original solution to be purified as it is supplied to that body and the operation is thus effective to produce a purified aqueous hydrogen peroxide of about the same concentration as the original solution.

One form of apparatus appropriate for carrying out the process of the invention is diagrammatically illustrated in the accompanying drawing. The invention will be described in detail by reference to its operation as conducted in apparatus of this form after outlining the general arrangement and operation of the illustrated apparatus. In the illustrated apparatus, the principal purification is effected in the flask 1 and its appurtenances and the preliminary purification is effected in the flask 2 and its appurtenances.

The crude aqueous hydrogen peroxide is charged into the closed flask 3 from which it is supplied through a cock 4 for controlling the rate of feed and a sight glass 5 for observing the rate of feed into the upper end of the column 6. Connection 7 is provided for equalizing the pressure between the flask 3 and the sight glass 5. The flask 3 may be of half liter capacity, for example. The column 6 may be 100 cm. long and 55 mm. in internal diameter and filled with 10 mm. Raschig rings. The lower end of the column 6 opens into the vaporizing flask 2. The flask 2 may be of one liter capacity, for example. The flask 2 is arranged within a steam jacket 8 provided with a supply connection 9 for low pressure heating steam and a discharge connection 10 for condensate. The discharge connection 12 opening into the lower part of the flask 2 projects into the flask a short distance to maintain a body of liquor in the flask during operation. The volume of this body of liquor may approximate 200 cc. for example. Vapors escaping from the column 6 pass through connection 13 to the water cooled condenser 14. The cooling coil in this condenser may comprise about 3 meters of 12 mm. tubing. The condensate flows through connection 15 from which it drips into the upper end of separator 16. The rate of vaporization in the flask 2 can be estimated by observing the rate of drip from connection 15 and thus controlled by regulating the admission of steam to the jacket 8. In the separator 16 the volatile organic impurities, lighter than water, rise as an oily phase and the water component sinks. The oily phase accumulating in excess of that quantity required to maintain return flow of the water component through connection 17 with the upper end of the column 6 overflows through connection 18 to the receiver 19 from which it is withdrawn from time to time through cock 20. To facilitate the separation in the separator 16, the separator 16 may be kept charged with an appropriate quantity of a water immiscible solvent such as toluene. Usually, in purifying aqueous hydrogen peroxide produced by oxidation of organic intermediates, sufficient of the solvent used in the oxidation, toluene or ditolylethane for example, accumulates in the separator 16 to keep in solution any impurities vaporized in the flask 2 and the column 6 which might otherwise tend to solidify in the separator 16. Separator 16 and receiver 19 are connected, through connection 21, with an appropriate vacuum pump 22. The water component separated in the separator 16 is returned to the upper end of the column 6 through connection 17. When it is desired to effect a concentration as well as a purification, some of this water component may be withdrawn through cock 23, but this of course involves the loss of the hydrogen peroxide content of the withdrawn part of the water component.

The aqueous hydrogen peroxide partially purified in the preliminary operation flows from the flask 2 to the flask 1 through connection 12 which is arranged as a U of sufficient depth to form an effective liquid seal between the two flasks. Flask 1 is arranged in a steam jacket 24 provided with a supply connection 25 for low pressure heating steam and discharge connection 26 for condensate. The flask 1 may be of one liter capacity, for example. The bottom of the flask 1 is dished the minimum required to withstand the external pressure in order to maintain a high ratio of heating surface to contained liquid volume. In operation this liquid body may approximate 100–200 cc. in volume, for example. This liquid body is purged from time to time by withdrawal through connection 27. Vaporized water and hydrogen peroxide escape through tube 28 and connection 29 to the water cooled condenser 30. The cooling coil in this condenser may comprise about 3 meters of 12 mm. tubing. The concentration of the body of liquor in the flask 1 with respect to hydrogen peroxide can be estimated by observation of the thermometer 31. Connection 32, with a cock as illustrated, is provided for introducing water to the flask 1 if this concentration becomes excessive, that is if it exceeds 75% $H_2O_2$. The inorganic non-volatile stabilizer may also be introduced, in solution or in suspension, through this connection 32. The pure aqueous hydrogen peroxide condensed in condenser 30 is discharged into receiver 33 from which it is withdrawn through cock 34 to the collection flask 35. The receiver 33 is connected, through connection 36, to the vacuum pump 22.

The illustrated apparatus, or that part of it in contact with aqueous hydrogen peroxide, is constructed of glass of composition inert with respect to hydrogen peroxide. Appropriate materials of construction include "Pyrex" glass, silica, stoneware, tin, some stainless steels and some alloys of aluminum. Materials tending catalytically to decompose hydrogen peroxide, such as ordinary steel and nickel for example, should of course be avoided.

In the preliminary purification, volatile impurities are eliminated without substantial loss of hydrogen peroxide notwithstanding the fact that most such impurities, those found in aqueous hydrogen peroxide produced by oxidation of organic intermediates for example, are less volatile than hydrogen peroxide. Water is more volatile than hydrogen peroxide. The vapor mixture in equilibrium with boiling aqueous hydrogen peroxide containing 30% $H_2O_2$ under an absolute pressure of 40 mm. of mercury, for example, will contain only about 3% $H_2O_2$. In the operation of apparatus such as that illustrated, dilution of the crude aqueous hydrogen peroxide with reflux water in the upper end of the column may bring the $H_2O_2$ content of the vapor mixture at this point to ½% or 1% under these conditions. Thus, large amounts of water can be vaporized without vaporizing much of the hydrogen peroxide. Since the volatile impurities are present in but small amount, substantially all of these impurities can be vaporized by the partial pressure effect of the vaporized water, with adequate contact between the water vapor and the incoming crude material as in a column, without vaporizing much of the hydrogen peroxide. By returning the water component after separation of the volatile impurities from the condensed vapors this operation can be conducted without substantial change of the composition of the original aqueous hydrogen peroxide with respect to water and hydrogen peroxide. This vaporization is with advantage effected by countercurrent flow in a column as in the apparatus illustrated. This column may be of the bubbler type, the packed type or of any other conventional type. If a packed column is used, as in the apparatus illustrated, the vapor velocity under an absolute pressure of 40 mm. of mercury, for example, should be limited not to exceed about 2 meters per second and, if the packing is in the form of Raschig rings, the diameter or length of the rings should not exceed about one-sixth the internal diameter of the column. In general, effective elimination of volatile impurities can be accomplished, in apparatus such as that illustrated in the drawing, by continuous vaporization at a volume rate approximating one-third of the feed rate. If the absolute pressure is limited not to exceed about 40 mm. of mercury, for example, the temperature of boiling aqueous hydrogen peroxide of 30% $H_2O_2$ concentration will not exceed about 38° C. Under such conditions, there is so little tendency toward decomposition that the addition of a stabilizer is not necessary. It is advisable, however, to avoid prolonged contact between the aqueous hydrogen peroxide and heated surfaces in the vaporizing receptacle.

In the principal purification, water and hydrogen peroxide are vaporized from a body of liquor maintained at substantially constant volume. Thus, the ratio of hydrogen peroxide to water vapor in the vapor effluent is substantially identical with this ratio for the aqueous hydrogen peroxide supplied to the purification. For example, if the aqueous hydrogen peroxide supplied to the purification is of 30% $H_2O_2$, the vaporized aqueous hydrogen peroxide will approximate 30% $H_2O_2$ concentration. The concentration of hydrogen peroxide in the body of liquor in the vaporizing receptacle increases until it is in equilibrium with the vapor effluent. The body of liquor being small, however, this does not substantially effect the identity between the concentration of the aqueous hydrogen peroxide supplied to and that taken off from the principal purification. With a vapor effluent of a 30% $H_2O_2$ concentration, for example, the concentration of hydrogen peroxide in the body of liquor in the vaporizing receptacle will approximate 68% $H_2O_2$. At atmospheric pressure, the boiling temperature of aqueous hydrogen peroxide of such concentration is high enough to involve excessive decomposition, but under subatmospheric pressures the necessary vaporization can be effected at lower temperatures. For example, the boiling temperature of aqueous hydrogen peroxide of 68% $H_2O_2$ concentration is about 73° C. under an absolute pressure of 40 mm. of mercury and about 67° C. under an absolute pressure of 14 mm. of mercury. At the temperatures corresponding to such subatmospheric pressures, excessive decomposition can be avoided by limiting the holding time in the body of liquor from which the aqueous hydrogen peroxide is vaporized to a maximum of 30 minutes, particularly if a stabilizer is used, or better to a maximum of 20 minutes. The provision of a stabilizer for hydrogen peroxide in the body of liquor from which aqueous hydrogen peroxide is vaporized in the principal purification is, however, one of the important features of this invention. As vaporization proceeds, in the principal purification of the invention, impurities accumulate in the body of liquor from which vaporization is effected and are eliminated by periodic purging of this body of liquor. The frequency of purges is determined by the rate of accumulation of such impurities. The body of liquor is purged with sufficient frequency to keep the maximum concentration of such impurities low enough to permit their discharge with the purged liquor. The presence of a stabilizer in this body of liquor lessens decomposition and makes possible the prolongation of the effective operating periods between purges. By adding the stabilizer directly to the body of liquor, for example immediately after each purge, it is kept present in fixed amount. The inorganic non-volatile stabilizers of hydrogen peroxide are generally useful for this purpose. For example, sodium stannate and sodium pyrophosphate give good results. Sodium stannate may be added to the body of liquor in the vaporizing receptacle in amounts sufficient to provide a concentration of from 2 to 3 grams per liter, for example. Since the stabilizer does not appear in the purified aqueous hydrogen peroxide, special precautions to peptize the stabilizer or to adjust the hydrogen ion concentration of the product to keep the purified solution clear are not necessary.

In referring to "holding time," reference is intended to the average time in the body of liquor in the vaporizing receptacle, as determined by dividing the liquid volume in the receptacle by the liquid feed rate, using consistent units. For example, if the liquor volume in the vaporizing receptacle were 100 cc. and the feed rate were 20 cc. per minute, the holding time would be 5 minutes.

The vaporizing receptacle used in the principal purification of this invention is not a "flash" pot. As distinguished from the "flash" pot in which evaporation to dryness is effected instantaneously, or practically so, a body of boiling liquor is maintained in the vaporizing receptacle in which impurities accumulate without deposition on the heating surface and consequently without interference with the thermal efficiency of the heat transfer and without any tendency toward local overheating induced by deposition on the heating surface. The vapor takeoff from the vaporizing receptacle should be arranged to afford adequate opportunity for separation of entrained liquid due to foaming in the vaporizing receptacle as impurities accumulate. This opportunity is afforded by prolonged vertical travel through connection 28 in the apparatus illustrated.

The invention will be further illustrated by the following example of an operation embodying the invention as carried out in the apparatus illustrated in the drawing: crude aqueous hydrogen peroxide, containing 27.75% $H_2O_2$, upwards of 76 parts per million of organic impurities and upwards of 63 parts per million of inorganic impurities and also containing globules of a heavy red oil irregularly dispersed therethrough, produced by oxidation of parahydrazobenzene in ditolyl ethane, was fed to column 6 at a rate of 900–1000 cc. per hour. In the flask 2, water was vaporized at a rate of 300–600 cc. per hour. The flask 2 was maintained under an absolute pressure of 40 mm. of mercury and at a temperature of 38°–40° C. Separated impurities collected as coalescing oily droplets in the separator 16. The feed rate to the column 6 plus the rate of reflux from the separator 16 totaled 1200–1600 cc. per hour. The liquor flowing downwardly through the column 6 was yellow at the upper end of the column and substantially colorless at the lower end of the column. The overflow from the flask 2 to the flask 1 was substantially colorless. A body of liquor, about 100 cc. in volume, containing about 68% $H_2O_2$, was maintained in the flask 1. The holding time in the flask 1 approximated 7 minutes. This flask was maintained under an absolute pressure of 40 mm. of mercury and at a temperature of 71°–73° C. The body of liquor in the flask 1 was purged from time to time as the operation continued. Sodium stannate was added from time to time to maintain present in the body of liquor in the flask 1 a total of about 0.2 gram of this material as a stabilizer. The condensate collected in the receiver 33 was perfectly colorless and crystal clear aqueous hydrogen peroxide containing no measurable impurities. This product contained 27.7% $H_2O_2$. Material balances on the crude aqueous hydrogen peroxide and the purified aqueous hydrogen peroxide product indicated an overall loss of $H_2O_2$ of less than 1%.

While the invention has been described more particularly in an application of special value, the purification of concentrated aqueous solutions of hydrogen peroxide produced by oxidation of organic intermediates in solvents immiscible with water, it is of general application in the purification of hydrogen peroxide solutions where the purified solution is to be recovered at about the same concentration as the impure material. For example, it is applicable to the purification of concentrated aqueous solutions of hydrogen peroxide, however produced, which may have been contaminated by accident or in handling or in storage, with dust or oil or other impurities.

The advantages of the invention include purification of high degree with respect to volatile organic impurities as well as with respect to less volatile and non-volatile impurities including inorganic impurities, low losses of hydrogen peroxide due to incidental decomposition, the avoidance of hazards of destructive decomposition, simplicity of control and economical operation.

I claim:

1. In the purification of aqueous hydrogen peroxide containing a minor proportion of non-volatile impurities, the improvement which comprises vaporizing water and hydrogen peroxide under a subatmospheric pressure from a body of liquor comprising aqueous hydrogen peroxide to which the hydrogen peroxide solution to be purified is supplied while maintaining in said body of liquor a substantial hydrogen peroxide concentration not exceeding 75% $H_2O_2$ by weight on said body of liquor at a rate sufficient to limit the holding time in said body of liquor to a maximum of 30 minutes, periodically purging said body of liquor to eliminate accumulating non-volatile impurities, and condensing the vapors to form the purified aqueous hydrogen peroxide.

2. In the purification of aqueous hydrogen peroxide containing a minor proportion of non-volatile impurities, the improvement which comprises vaporizing water and hydrogen peroxide under an absolute pressure not exceeding about 100 mm. of mercury from a body of liquor comprising aqueous hydrogen peroxide to which the hydrogen peroxide solution to be purified is supplied while maintaining in said body of liquor a substantial hydrogen peroxide concentration not exceeding 75% $H_2O_2$ by weight on said body of liquor at a rate sufficient to limit the holding time in said body of liquor to a maximum of 30 minutes, periodically purging said body of liquor to eliminate accumulating non-volatile impurities and condensing the vapors to form the purified aqueous hydrogen peroxide.

3. In the purification of aqueous hydrogen peroxide containing a minor proportion of non-volatile impurities, the improvement which comprises vaporizing water and hydrogen peroxide under a subatmospheric pressure from a body of liquor comprising aqueous hydrogen peroxide to which the hydrogen peroxide solution to be purified is supplied while maintaining in said body of liquor a substantial hydrogen peroxide concentration not exceeding 75% $H_2O_2$ by weight on said body of liquor at a rate sufficient to limit the holding time in said body of liquor to a maximum of 30 minutes in the presence of an inorganic non-volatile stabilizer, periodically purging said body of liquor to eliminate accumulating non-volatile impurities and condensing the vapors to form the purified aqueous hydrogen peroxide.

4. In the purification of aqueous hydrogen peroxide containing a minor proportion of non-volatile impurities, the improvement which comprises vaporizing water and hydrogen peroxide under a subatmospheric pressure from a body of liquor comprising aqueous hydrogen peroxide to which the hydrogen peroxide solution to be purified is supplied while maintaining in said body of liquor a substantial hydrogen peroxide concentration not exceeding 75% $H_2O_2$ by weight on said body of liquor at a rate sufficient to limit the holding time in said body of liquor to a maximum of 30 minutes, periodically purging said body of liquor to eliminate accumulating non-volatile impurities, periodically adding an inorganic non-volatile stabilizer to said body of liquor and condensing the vapors to form the purified aqueous hydrogen peroxide.

5. In the purification of aqueous hydrogen peroxide containing a minor proportion of non-volatile impurities, the improvement which comprises vaporizing water and hydrogen peroxide under a subatmospheric pressure from a body of liquor comprising aqueous hydrogen peroxide to which the hydrogen peroxide solution to be purified is supplied while maintaining in said body of liquor a substantial hydrogen peroxide concentration not exceeding 75% $H_2O_2$ by weight on said body of liquor at a rate sufficient to limit the holding time in said body of liquor to a maximum of 20 minutes, periodically purging said body of liquor to eliminate accumulating non-volatile impurities and condensing the vapors to form the purified aqueous hydrogen peroxide.

6. In the purification of aqueous hydrogen peroxide containing volatile organic impurities and non-volatile impurities, the improvement which comprises vaporizing water from the hydrogen peroxide solution and passing the vapors in contact with the solution to vaporize volatile impurities, condensing the vapors, separating the vaporized and condensed impurities from the water component and returning the water component to the solution, then supplying the solution to a body of liquor comprising aqueous hydrogen peroxide and vaporizing water and hydrogen peroxide from said body under a subatmospheric pressure while maintaining in said body a substantial hydrogen peroxide concentration not exceeding 75% $H_2O_2$ by weight thereon at a rate sufficient to limit the holding time in said body to a maximum of 30 minutes, periodically purging said body to eliminate accumulating non-volatile impurities, and condensing the water and hydrogen peroxide vaporized from said body to form the purified aqueous hydrogen peroxide.

7. In the purification of aqueous hydrogen peroxide containing volatile organic impurities and non-volatile impurities, the improvement which comprises vaporizing water from the hydrogen peroxide solution and passing the vapors in contact with the solution to vaporize volatile impurities, condensing the vapors, separating the vaporized and condensed impurities from the water component and returning the water component to the solution, then supplying the solution to a body of liquor comprising aqueous hydrogen peroxide and vaporizing water and hydrogen peroxide from said body under a subatmospheric pressure while maintaining in said body a substantial hydrogen peroxide concentration not exceeding 75% $H_2O_2$ by weight thereon at a rate sufficient to limit the holding time in said body to a maximum of 30 minutes in the presence of an inorganic non-volatile stabilizer, periodically purging said body to eliminate accumulating non-volatile impurities, and condensing the water and hydrogen peroxide vaporized from said body to form the purified aqueous hydrogen peroxide.

8. In the purification of aqueous hydrogen peroxide containing volatile organic impurities and non-volatile impurities, the improvement which comprises vaporizing water from the hydrogen peroxide solution and passing the vapors in contact with the solution to vaporize volatile impurities, condensing the vapors, separating the vaporized and condensed impurities from the water component and returning the water component to the solution, then supplying the solution to a body of liquor comprising aqueous hydrogen peroxide and vaporizing water and hydrogen peroxide from said body under a subatmospheric pressure while maintaining in said body a substantial hydrogen peroxide concentration not exceeding 75% $H_2O_2$ by weight thereon at a rate sufficient to limit the holding time in said body to a maximum of 20 minutes, periodically purging said body to eliminate accumulating non-volatile impurities, and condensing the water and hydrogen peroxide vaporized from said body to form the purified aqueous hydrogen peroxide.

9. In the purification of aqueous hydrogen peroxide containing volatile organic impurities and non-volatile impurities, the improvement which comprises vaporizing water from the hydrogen peroxide solution and passing the vapors in contact with the solution to vaporize volatile impurities, condensing the vapors, separating the vaporized and condensed impurities from the water component and returning the water component to the solution, then supplying the solution to a body of liquor comprising aqueous hydrogen peroxide and vaporizing water and hydrogen peroxide from said body in about the proportions in which they are present in the original solution under a subatmospheric pressure while maintaining in said body a substantial hydrogen peroxide concentration not exceeding 75% $H_2O_2$ by weight thereon at a rate sufficient to limit the holding time in said body to a maximum of 30 minutes, periodically purging said body to eliminate accumulating non-volatile impurities, and condensing the water and hydrogen peroxide vaporized from said body to form a purified aqueous hydrogen peroxide of about the same concentration as the original solution.

10. In the purification of aqueous hydrogen peroxide containing volatile organic impurities, the improvement which comprises vaporizing water from an aqueous hydrogen peroxide solution and passing the aqueous hydrogen peroxide solution containing volatile impurities in contact with the resultant water vapor to vaporize said volatile impurities, condensing the vapors, separating the vaporized and condensed impurities from the condensed water component and returning the water component to the solution, and during the purifying treatment drawing off as a liquid from the zone in which said water is vaporized the hydrogen peroxide solution from which volatile impurities have been removed.

11. In the purification of aqueous hydrogen peroxide containing volatile organic impurities, the improvement which comprises vaporizing water from an aqueous hydrogen peroxide solution under subatmospheric pressure and passing the aqueous hydrogen peroxide solution containing volatile impurities in contact with the resultant water vapor to vaporize said volatile impurities, condensing the vapors, separating the vaporized and condensed impurities from the condensed water component and returning the water component to the solution, and during the purifying treatment drawing off as a liquid from the zone in which said water is vaporized the hydrogen peroxide solution from which volatile impurities have been removed.

12. In the purification of aqueous hydrogen peroxide containing volatile organic impurities, the improvement which comprises vaporizing water from an aqueous hydrogen peroxide solution under an absolute pressure not exceeding about 100 mm. of mercury and passing the aqueous hydrogen peroxide solution containing volatile impurities in contact with the resultant water vapor to vaporize said volatile impurities, condensing the vapors, separating the vaporized and condensed impurities from the condensed water component and returning the water component to the solution, and during the purifying treatment drawing off as a liquid from the zone in which said water is vaporized the hydrogen peroxide solution from which volatile impurities have been removed.

13. In the purification of aqueous hydrogen peroxide containing volatile organic impurities, the improvement which comprises vaporizing water from an aqueous hydrogen peroxide solution and passing the aqueous hydrogen peroxide solution containing volatile impurities in contact with the resultant water vapor to vaporize said volatile impurities, condensing the vapors, separating the vaporized and condensed impurities from the water component by extraction with a solvent immiscible with water and returning the water component to the solution, and during the purifying treatment drawing off as a liquid from the zone in which said water is vaporized the hydrogen peroxide solution from which volatile impurities have been removed.

ROBERT B. MacMULLIN.